(12) United States Patent
Poza Jimenez et al.

(10) Patent No.: US 8,102,866 B2
(45) Date of Patent: Jan. 24, 2012

(54) CENTRALIZED SYSTEM FOR THE REMOTE MONITORING OF MULTIMEDIA SIGNALS

(75) Inventors: Manuel Poza Jimenez, Madrid (ES); Pablo Castellanos Zamora, Madrid (ES); Ramon Cruz Vilches, Madrid (ES); Jose Sanchez Camara, Madrid (ES); Andrés Lopez Alonso, Madrid (ES)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/526,753

(22) PCT Filed: Feb. 19, 2008

(86) PCT No.: PCT/EP2008/052020
§ 371 (c)(1),
(2), (4) Date: Mar. 30, 2010

(87) PCT Pub. No.: WO2008/101933
PCT Pub. Date: Oct. 28, 2008

(65) Prior Publication Data
US 2010/0188981 A1    Jul. 29, 2010

(30) Foreign Application Priority Data
Feb. 19, 2007    (EP) ..................................... 07381010

(51) Int. Cl.
*H04L 12/28*    (2006.01)

(52) U.S. Cl. ........................................ 370/401; 370/351
(58) Field of Classification Search .................. 370/401, 370/402, 365, 386, 389, 420, 486, 391, 395.64, 370/400
See application file for complete search history.

(56) References Cited

U.S. PATENT DOCUMENTS 6,968,394 B1 * 11/2005 El-Rafie ....................... 709/245
2006/0294259 A1    12/2006 Matefi et al.

FOREIGN PATENT DOCUMENTS

EP    1 376 934 A1    1/2004

OTHER PUBLICATIONS

European Search Report.

* cited by examiner

*Primary Examiner* — Brenda H Pham
(74) *Attorney, Agent, or Firm* — Fay Sharpe LLP

(57) ABSTRACT

A centralized system for the monitoring of remote multimedia signals which monitors and assesses the quality of the services distributed over an IP packet telecommunications network (30) comprising a plurality of customer premises equipment (22-2), one of the items of such equipment being connectable to an access gateway (21), such as a digital subscriber line access multiplexer (DSLAM), via a line (23) susceptible of receiving multimedia content such as data, voice and video over IP; the said content being returned direct to the access multiplexer via a return line (24).

12 Claims, 1 Drawing Sheet

CENTRALIZED SYSTEM FOR THE REMOTE MONITORING OF MULTIMEDIA SIGNALS

SUBJECT OF THE INVENTION

The present invention refers, in general, to a centralized system for monitoring and assessing the quality of telecommunications services and, more specifically, to a device hereby to assess and monitor the quality of the services offered over packet telecommunications networks, such as the distribution of television via Internet protocol based networks (IPTV).

STATE OF THE ART

In recent years access networks have been laid out fundamentally with xDSL (digital subscriber loop) technologies which permit the exploitation of the copper based subscriber loop infrastructure.

Up to now the xDSL access technologies have covered the technical, management and capacity requirements imposed by the services which the market has demanded.

However, users are increasingly calling for more multimedia services based principally on quality video and voice over Internet, in addition to the existing Internet access services, known collectively as "triple play", and operators are thus having to progressively increase the capacity of their access networks.

The aforementioned circumstances has allowed operators to offer a broad range of services of all kinds Via applications based on Internet protocols, such as IPTV and the streaming of multimedia content, voice and data over IP.

In order to provide multimedia services in real time on IP networks it is necessary to comply with a series of requirements which depend on the service or the combination of services offered. For example, a given bandwidth, which may be different in each transmission direction, is needed so that the incoming packets line may allow the multimedia signals to be regenerated correctly. The operator must also guarantee that the quality of encoding is satisfactory and that delays, network latency and the percentage of lost packets are not in excess of given limits depending on the type of service.

As a consequence of the foregoing, the provider of IPTV and other real-time services needs to control the quality of the service (QoS) given to the end user and is therefore obliged to install, throughout the Internet, the metropolitan network or the access network, quality of service monitoring equipment.

In order to assess the quality of that service, reference is made to such parameters as the delay of the packets of data transmitted, the bandwidth used in the communication, the packet delay jitter or the loss probability of packets, or others of a similar nature which may permit the appraisal of the quality of the service of the stream of television data transmitted from the content provider to the subscribers as a whole. In the case of IPTV, multimedia signals are also supervised direct via TV monitor observation. A perception of the service similar to that of the end user may thus be achieved.

The monitoring signals and the aforementioned assessment data are gathered at different points distributed throughout the telecommunications network.

It is known in the state of the art, shown in FIG. 1, that a digital subscriber line access multiplexer 21 represents one of the possible points of monitoring. It is to these items of equipment, which are generally located in telephone exchanges, that the lines of the end users are connected. The connection is made via customer premises equipment 22. An example of customer premises equipment 22-1 is an ADSL router to which the end user may connect a range of items such as multimedia decoders or set-top boxes 27-1, computers PC or IP telephones. FIG. 1 represents an example in which customer premises equipment 22-1, set-top boxes 27-1, computer PC and an IP telephone make up the home equipment of an end subscriber.

The digital subscriber line access multiplexer 21 such as DSLAM may have a plurality of subscriber ports. In order to monitor the multimedia or data signals received by the digital subscriber line access multiplexer 21 it is common practice to reserve one of those ports for the purpose.

It is known in the art that in order to obtain the parameters required for the monitoring and assessment of service quality in a digital subscriber line access multiplexer 21 the procedure is to connect to the subscriber port reserved for that purpose, in cascade and via a monitoring line 23 as shown in FIG. 1, a customer premises equipment 22-2, a multimedia decoding device or set-top box 27-2 and a computer 11. These items of equipment are installed beside the digital subscriber line access multiplexer 21.

The computer 11 is in turn connected, likewise in cascade, to the DSLAM 21 or to some other item of telecommunications network access equipment via a return line 24. The computer 11 receives the signal generated by the set-top boxes 27-2, for example, an analogue television signal, processes it and transmits it via the return line 24 to a central server 29 by means of a communications channel laid down through the telecommunications network 30. The computer 11 similarly gathers and transmits to the central server 29 the signal service quality parameters.

At the central server 29 the monitoring and assessment of the multimedia signal received by every DSLAM 21 from the provider of content and/or services is performed by means of direct observation and the corresponding algorithms based on the parameters registered in each case.

The known system of monitoring and assessment has a number of disadvantages. The interconnection of various pieces of equipment and middleware is required to obtain the return signal for monitoring and the quality of service assessment parameters. Further, the multimedia signal received by the central server 29 is not the digital signal received by the DSLAM 21 but, instead, a signal processed by the set-top box 27-2 and the computer 11 connected to the monitoring line 24 as shown in FIG. 1.

As a result, the assessment of the television signal received by the DSLAM 21 is performed in an indirect manner and calls for the use of a complex system including various items of equipment. The overall cost of the quality of service assessment system is therefore high, while the monitored signal is not that received by the DSLAM 21.

CHARACTERISTICS OF THE INVENTION

The present invention seeks to resolve or to minimize one or more of the disadvantages mentioned above by means of a centralized system for monitoring remote multimedia signals as described in claim 1. The embodiments of the invention are as established in the dependent claims.

One object of the invention is that of providing a system for the monitoring and assessment of the quality of the services rendered by a provider of content and/or services within a packet telecommunications network which genuinely gauges the quality of the triple play services, comprising voice, data and television over IP, delivered by that provider to the end subscriber.

The packet network quality of service assessment data takes in both QoS parameters perceptible to the customer and those pertaining to the operation of the network.

Another object of the invention is that of providing a simple system requiring a minimum amount of devices. The number of such items of equipment is consequently reduced.

A further object of the invention is that of avoiding the increase of restrictions on the topology of the communications network and on the increase in the number of access gateways such as access multiplexers DSLAMs.

A further object of the invention is that of providing a monitoring and assessment system requiring a minimum consumption of electricity for its operations and thus helping the parties to the Kyoto protocol to meet their obligations thereunder.

A further object of the invention is that of providing an Internet QoS monitoring and assessment system at an affordable overall cost for the Internet content provider, so that the system may adapt easily to market needs at any time and that there may be scalability in the investment in network infrastructure and the assessment of Internet services.

BRIEF DESCRIPTION OF THE FIGURES

A more detailed explanation of the invention is provided in the following description of the attached figures.

DESCRIPTION OF THE INVENTION

Figure 1:
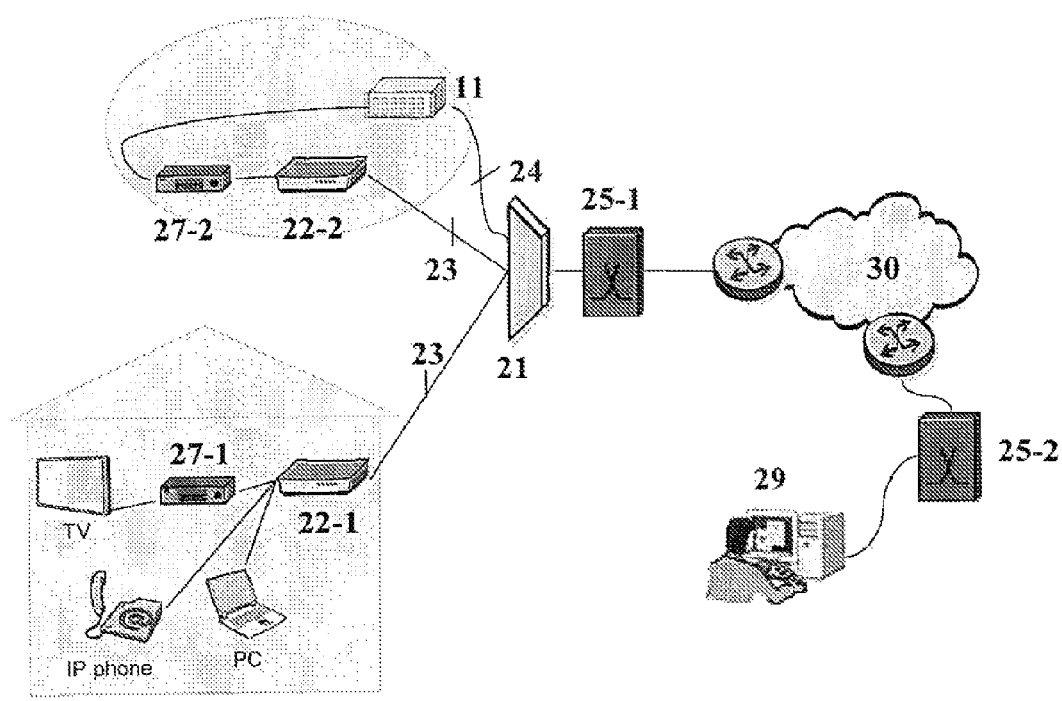
FIG. 1 shows a packet telecommunications network monitoring system according to the state of the art.
Figure 2:
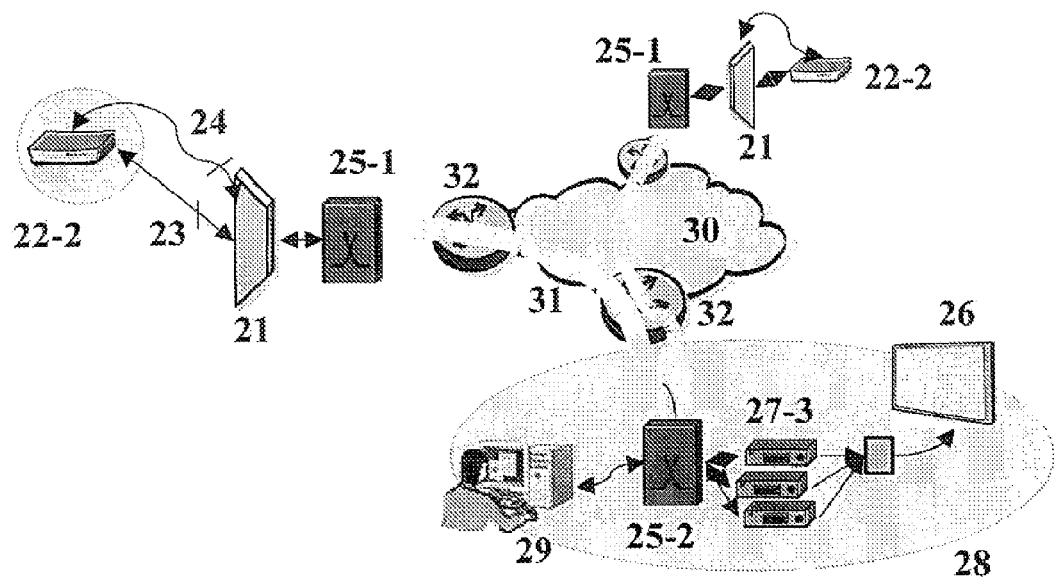
FIG. 2 shows an IP monitoring system according to the invention.

There follows a description, with reference to FIG. 2, of a system for the monitoring of the IP multimedia services rendered by a provider of IP content and/or services.

The assessment system includes an item of subscriber access equipment 22-2 such as customer premises equipment CPE, an ADSL modem, connected to an access gateway 21 such as a digital subscriber line access multiplexer DSLAM via a line reserved 23 for that purpose.

The access multiplexer 21 may be located OD the premises of the provider's customer, which may for example be a company, although it is more commonly located in a telephone exchange.

When the access multiplexer 21 receives from the Internet content provider Internet services such as triple play services it relays the stream of multimedia content, which includes IPTV, to subscriber ports connected thereto.

One of the items of subscriber access equipment receiving that flow of television over Internet is subscriber access equipment 22-2 which forms part of the monitoring system. The transmission of the IPTV stream from the access multiplexer 21 takes place via a monitoring line 23.

Upon receiving the IPTV stream, subscriber access equipment 22-2 returns it to the access multiplexer DSLAM 21 from which it came via the return line 24.

In the implementation as shown in FIG. 2, subscriber access equipment 22-2 receives the multimedia stream from access multiplexer DSLAM 21 via a downstream line 23 as an ADSL line and returns it via an Ethernet line 24 in turn linking subscriber access 22 to the access multiplexer DSLAM 21.

The access multiplexer 21 is in turn linked to switch such as a first Ethernet switch 25-1 and thus, via a telecommunications network 30 Which includes an IP network, it is connected to the monitoring server 29 which is in turn linked to the network 30 through a second Ethernet switch 25-2.

The IPTV stream returned to the access multiplexer 21 from the subscriber access equipment 22-2 is relayed to the monitoring server 29 through a communication channel 31 laid down between the first and second Ethernet switches 25-1, 25-2.

The communication channel 31 thus laid down across the telecommunications network 30 conveys packets of data relating to the returned IPTV stream obtained through the application of a tunneling protocol such as the virtual leased line (VLL) protocol. By means of this procedure the packets of multimedia flow originally received by subscriber access equipment 22 from access multiplexer 21 may be transmitted to the monitoring server 29 without alteration.

The second Ethernet switch 25-2 is connected to at least one multimedia decoder 27-3 such as a set-top box. The number of set-top boxes 27-3 connected to that second switch 25-2 will depend on the number of access multiplexer DSLAM 21 to be monitored simultaneously.

By means of a computer application the operator of the central monitoring server 29 may relay to a given set-top box 27-3 the signal coming from a given access multiplexer 21 DSLAM. The set-top box 27-3 generates a television signal which may be seen on a monitor 26. Similarly, the operator of the central monitoring server 29 may perform on the set-top box 27-3 all or part of the actions that the end user may carry out with his remote control. The operator thus obtains a perception of the service similar to that of the end user.

The tunnel 31 between both switches 25-1, 25-2 also allows communications to be conveyed unaltered from the set-top box 27-3 controlled by the monitoring 29 server to the remote subscriber access equipment 22 used to send the monitoring signal of the access multiplexer DSLAMs 21.

Upon receipt of the packets of data relating to the monitoring signals from the access multiplexer DSLAMs 21, the central monitoring server 29 executes an assessment algorithm using the parameters obtained from the analysis of the packets received from each access multiplexer DSLAM 21.

The monitoring system of multimedia traffic 28 enables the remote connection of any subscriber access equipment 22-2 of a plurality of items of subscriber access equipment 22, with any set-top box 27-3 of a plurality of set-top box 27-3.

Also the monitoring system 28 permits the capture by the monitoring server 29 of the remote return signal coming from any of the subscriber access equipment 22-2. Furthermore, the monitoring server 29 may be connected to a set-top box 27-3 by means of infrared transmitters controlled by the monitoring server 29.

The embodiments and examples contained in this specification are put forward by way of explanation of the significance of the present invention and of the practical application thereof, so that experts in the art may put into practice and use the invention. The experts in the art will appreciate, however, that the preceding description and examples only constitute an outline. The description is not intended to be all encompassing, nor is the scope of the invention restricted thereto. Many modifications and variations may therefore be made without parting company with the spirit and scope of the following claims.

The invention claimed is:

1. A system of monitoring and assessing the quality of services distributed over a packet telecommunications network, the system comprising an access gateway configured to transmit multimedia stream to customer premises equipment over an xDSL downstream line of the packet telecommunications network, wherein the customer premises equipment is configured to return the received multimedia stream to the access gateway over an Ethernet line and the access gateway is configured to to transmit the received multimedia stream to a monitoring server over a communication channel of the packet telecommunications network.

2. The system according to claim 1, wherein the access gateway is connected to a first interface configured to connect to a second interface through a communication channel, wherein the communication channel comprises a virtual leased line (VLL).

3. The system according to claim 2, wherein the first and second interfaces are Ethernet switches, ATM switches, routers or access multiplexers.

4. The system according to claim 2, wherein the second interface is connectable to at least a multimedia decoder.

5. The system according to claim 1, wherein the customer premises equipment is an ADSL modem or a residential router.

6. The system according to claim 1, wherein the access gateway is a digital subscriber line access multiplexer.

7. The system according to claim 4, wherein the multimedia decoder is connectable to the monitoring server via the second interface, 8. The system according to claim 4, wherein the monitoring server is connectable to the multimedia decoder by means of an infrared transmitter controlled by the monitoring server.

9. The system according to claim 1, wherein upon receipt of packets of data relating to monitoring signals from the access gateway, the monitoring server is operative to execute an assessment algorithm using parameters obtained from an analysis of the packets received from the access gateway.

10. A method of monitoring and assessing the quality of services distributed over a packet telecommunications network comprising an access gateway, the method comprising:
    transmitting over an xDSL downlink line of the packet telecommunications network a multimedia stream from the access gateway to a customer premises equipment;
    returning over an Ethernet line from the customer premises equipment to the access gateway the multimedia stream received by the customer premises equipment; and
    transmitting over a communication channel of the packet telecommunications network from the access gateway to a remote monitoring server the multimedia stream received by the access gateway.

11. The method according to claim 10, wherein the method further comprises the step of transmitting the multimedia stream received by the access gateway using a tunnel communication protocol from the access gateway to the remote monitoring server.

12. The method according to claim 10, wherein upon receipt of packets of data relating to monitoring signals from the access gateway, the monitoring server executes an assessment algorithm using parameters obtained from an analysis of the packets received from the access gateway.

* * * * *